(12) United States Patent
Shim et al.

(10) Patent No.: US 9,103,415 B2
(45) Date of Patent: *Aug. 11, 2015

(54) PLANETARY GEAR TRAIN OF AUTOMATIC TRANSMISSION FOR VEHICLE

(71) Applicant: Hyundai Motor Company, Seoul (KR)

(72) Inventors: Hyu Tae Shim, Hwaseong-si (KR);
Kangsoo Seo, Yongin-si (KR);
Myonghoon Noh, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/143,344

(22) Filed: Dec. 30, 2013

(65) Prior Publication Data

US 2015/0005132 A1    Jan. 1, 2015

(30) Foreign Application Priority Data

Jul. 1, 2013    (KR) .......................... 10-2013-0076711

(51) Int. Cl.
*F16H 3/66* (2006.01)
*F16H 37/04* (2006.01)

(52) U.S. Cl.
CPC .................. *F16H 3/666* (2013.01); *F16H 3/66* (2013.01); *F16H 2037/047* (2013.01); *F16H 2200/006* (2013.01); *F16H 2200/2007* (2013.01); *F16H 2200/2046* (2013.01)

(58) Field of Classification Search
CPC ................. F16H 2037/048; F16H 2200/2007; F16H 2200/2046
USPC .................. 475/271, 286, 296, 302, 329, 330
See application file for complete search history.

(56) References Cited

U.S. PATENT DOCUMENTS

| | | | |
|---|---|---|---|
| 7,883,440 B2 * | 2/2011 | Phillips et al. ................. | 475/275 |
| 8,409,046 B2 * | 4/2013 | Phillips ........................... | 475/284 |
| 8,758,188 B2 * | 6/2014 | Lee et al. ....................... | 475/280 |
| 8,905,889 B2 * | 12/2014 | Lee et al. ....................... | 475/271 |
| 2006/0142111 A1 * | 6/2006 | Park .............................. | 475/269 |
| 2014/0148299 A1 * | 5/2014 | Lee et al. ....................... | 475/284 |

* cited by examiner

*Primary Examiner* — Justin Holmes
(74) *Attorney, Agent, or Firm* — Morgan, Lewis & Bockius LLP

(57) ABSTRACT

A planetary gear train of an automatic transmission may include: a first shaft; a second shaft parallel with the first shaft; a first gear set on the first shaft including a first element selectively connected to the first shaft, a second element selectively connected to the first shaft and a transmission housing, and a third element; a second gear set on the second shaft including a fourth element operably connected to the first element and selectively connected to the first shaft, a fifth element connected to the third element and directly connected to an output gear, and a sixth element selectively connected to the first shaft and selectively connected to the housing; three transfer gears; and frictional elements including clutches selectively connecting the first shaft to elements of the first and second gear sets and brakes selectively connecting elements of the first and second gear sets to the housing.

14 Claims, 14 Drawing Sheets

FIG.2

|     | C1 | C2 | C3 | C4 | B1 | B2 |
|-----|----|----|----|----|----|----|
| 1ST | ●  |    |    |    | ●  |    |
| 2ND |    | ●  |    |    | ●  |    |
| 3RD |    |    | ●  |    | ●  |    |
| 4TH |    | ●  | ●  |    |    |    |
| 5TH | ●  |    | ●  |    |    |    |
| 6TH |    |    | ●  | ●  |    |    |
| 7TH | ●  |    |    | ●  |    |    |
| 8TH |    | ●  |    | ●  |    |    |
| Rev | ●  |    |    |    |    | ●  |

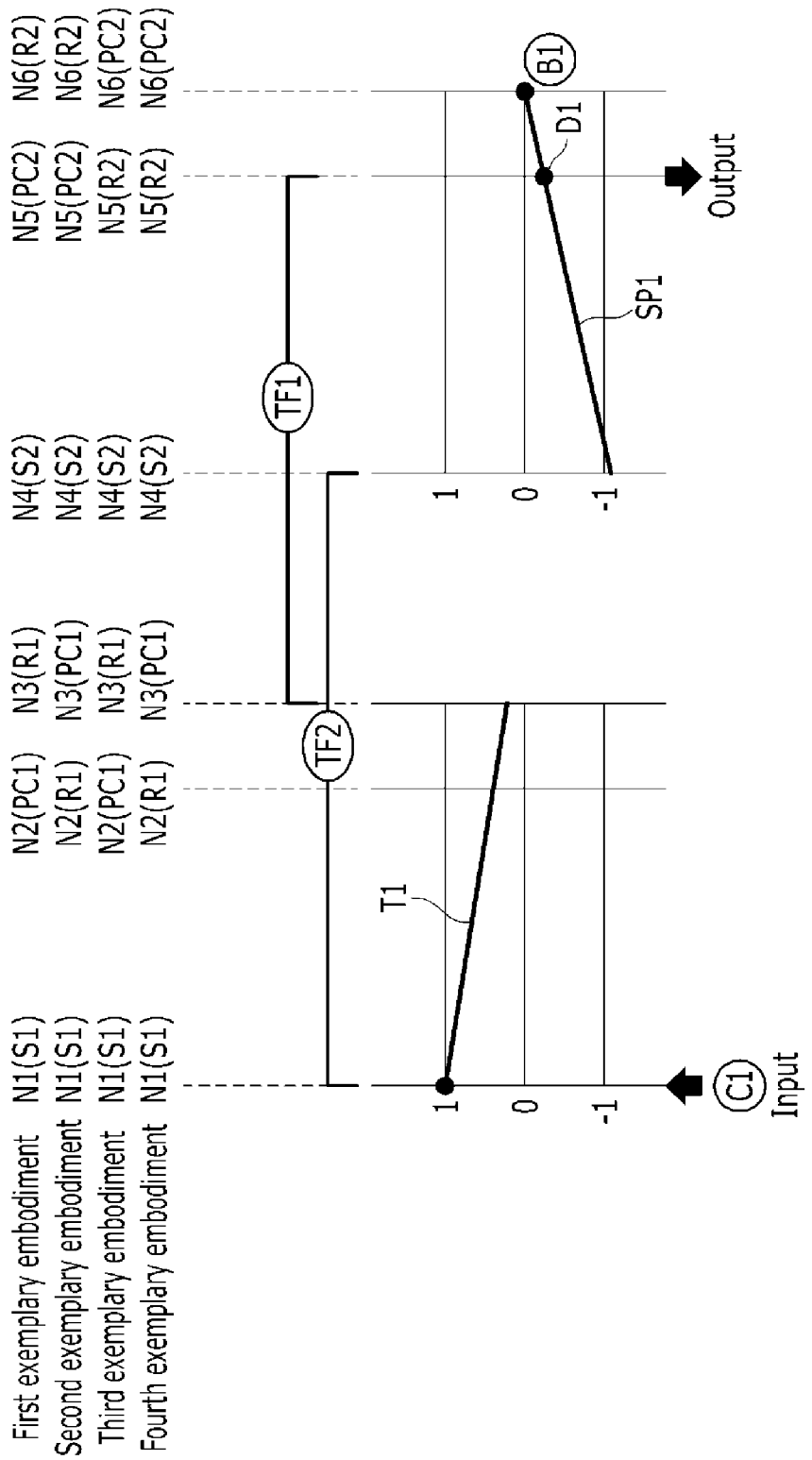

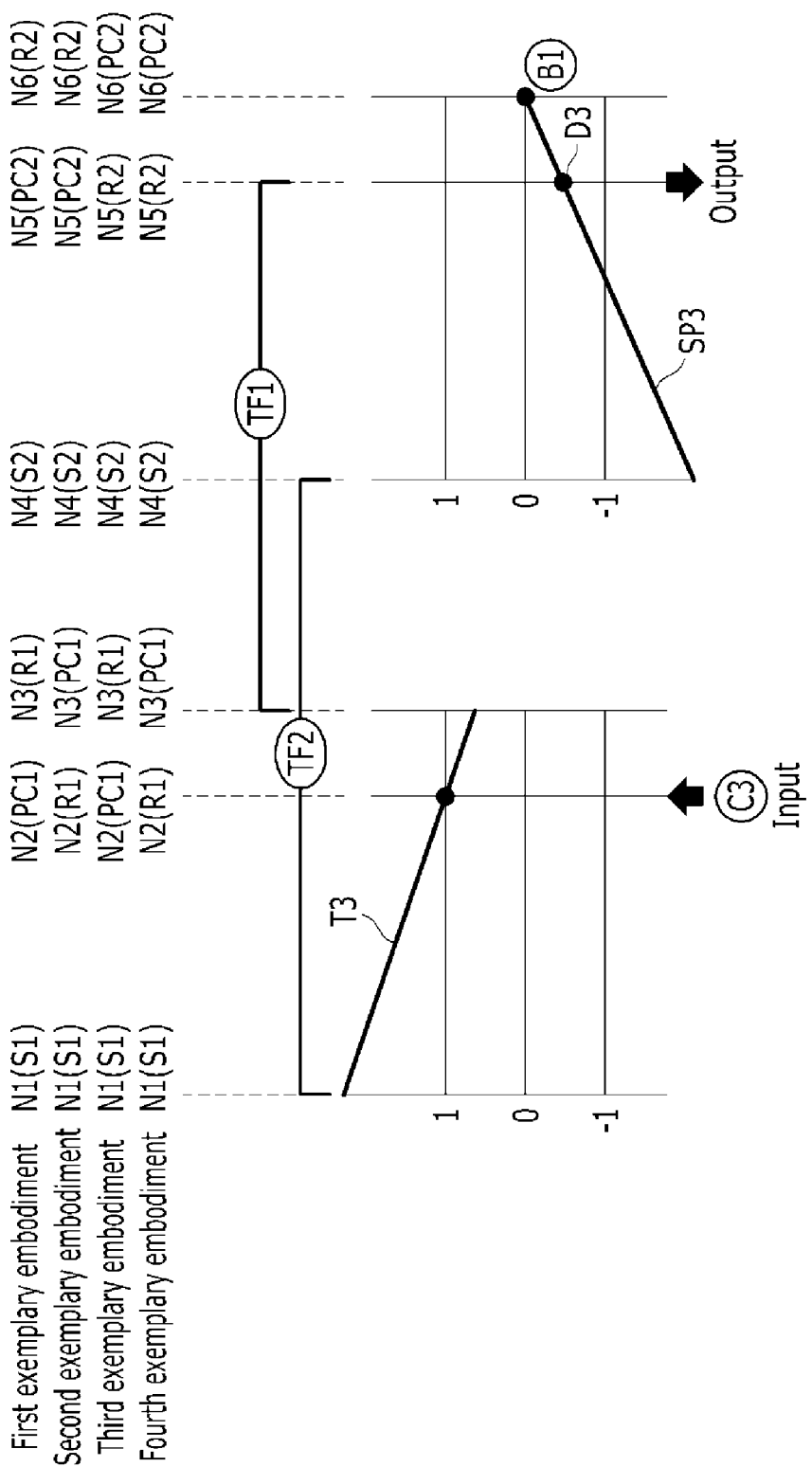

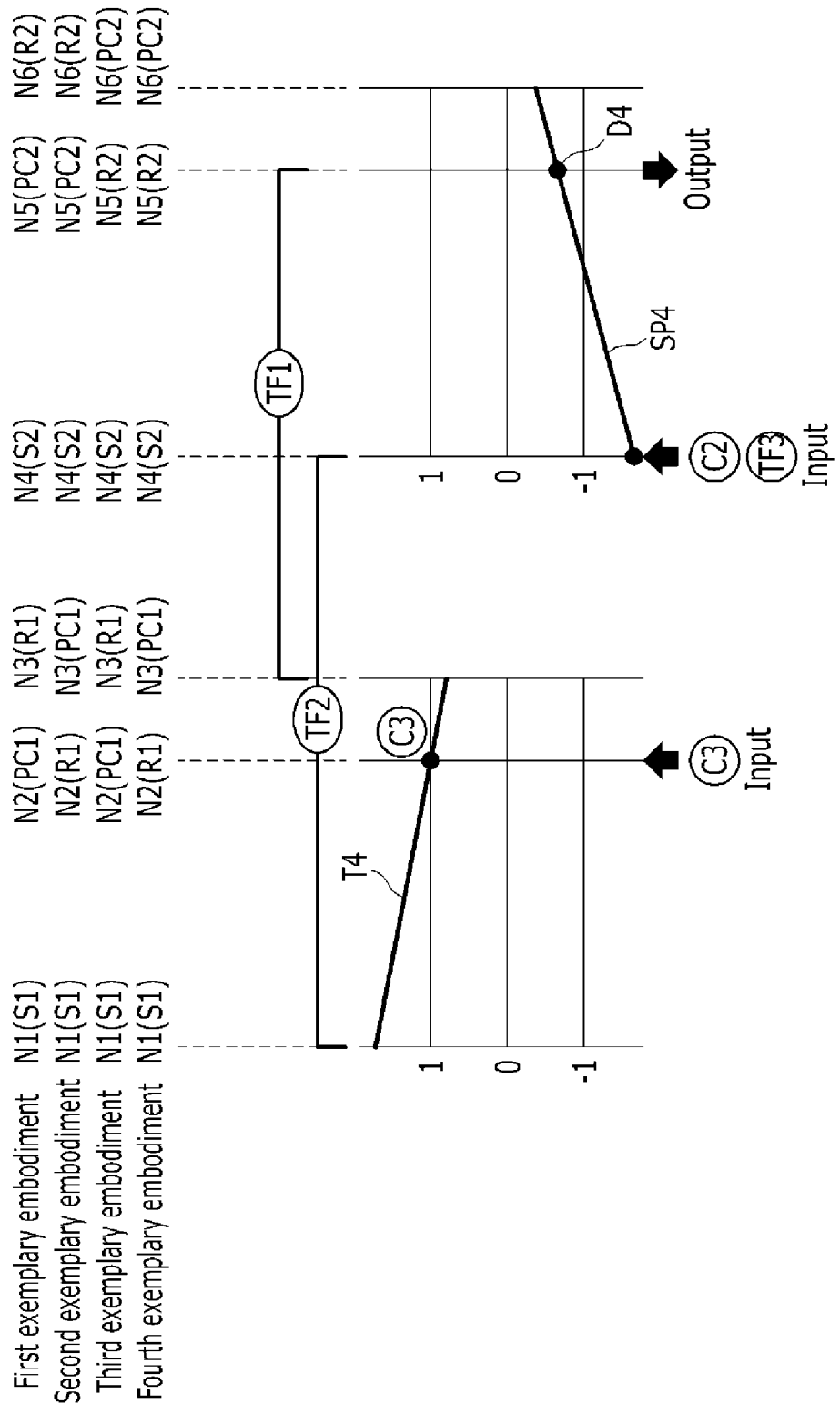

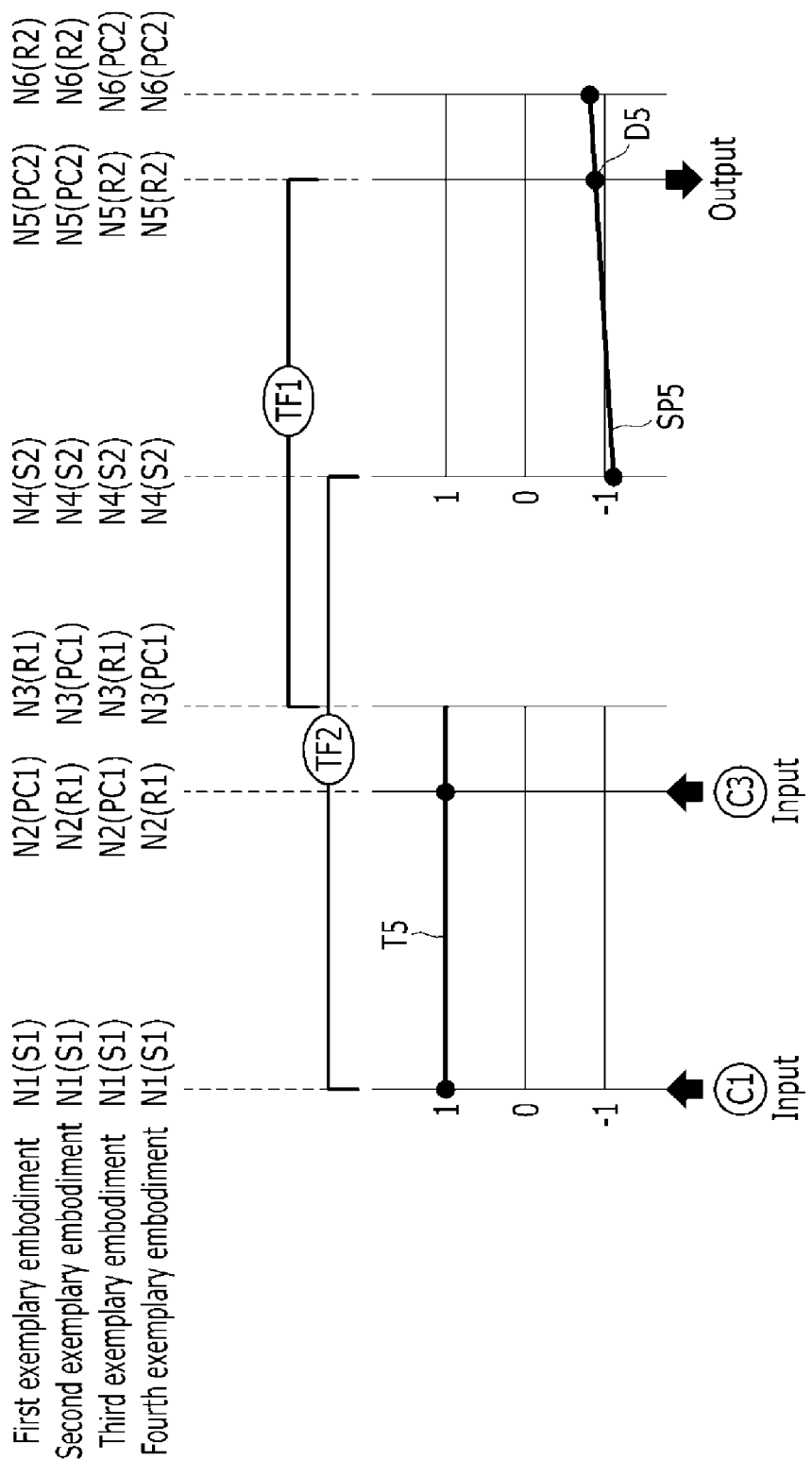

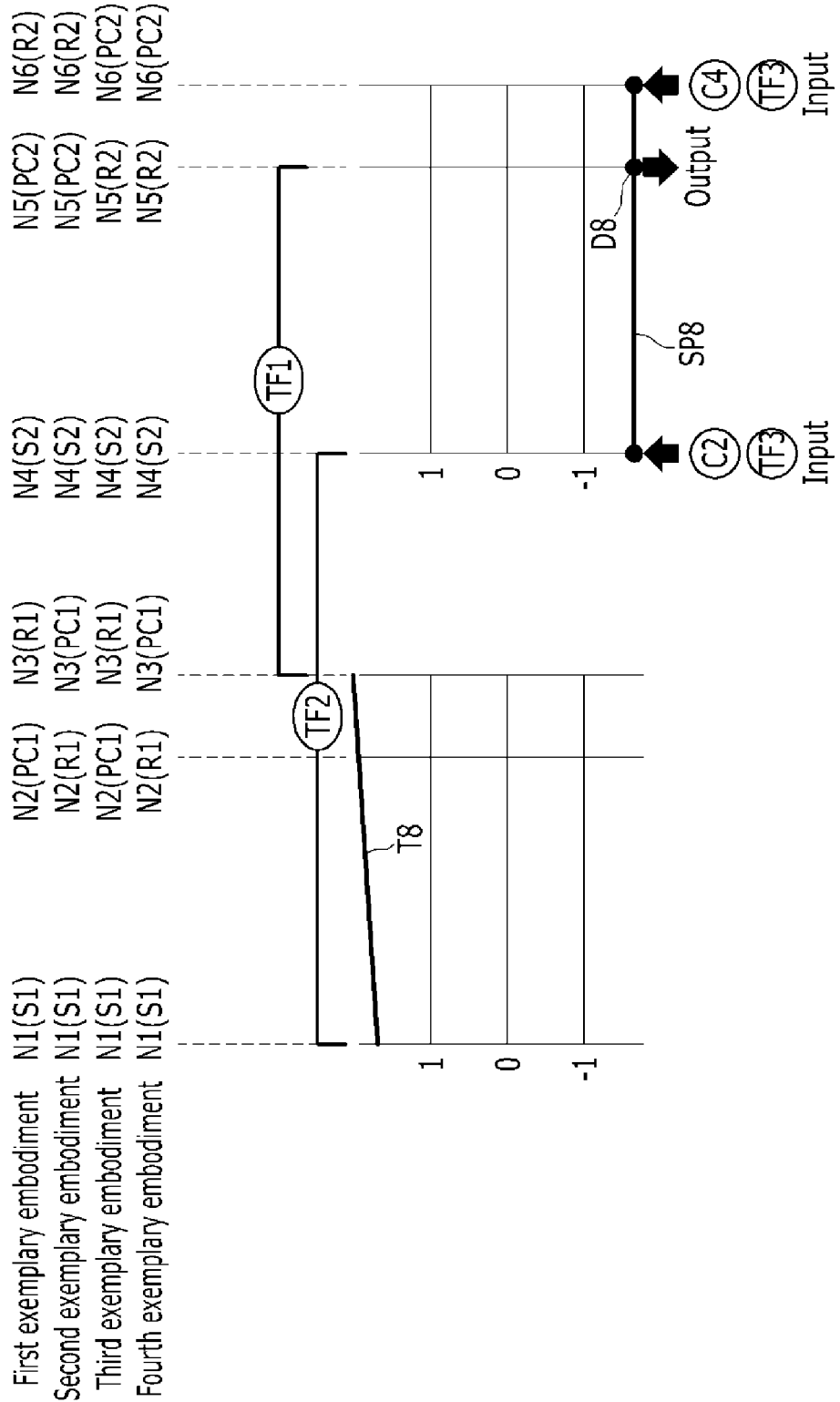

PLANETARY GEAR TRAIN OF AUTOMATIC TRANSMISSION FOR VEHICLE

CROSS-REFERENCE TO RELATED APPLICATION

The present application claims priority of Korean Patent Application Number 10-2013-0076711 filed Jul. 1, 2013, the entire contents of which application is incorporated herein for all purposes by this reference.

BACKGROUND OF INVENTION

1. Field of Invention

The present invention relates to an automatic transmission for a vehicle. More particularly, the present invention relates to a planetary gear train of an automatic transmission for a vehicle that can improve mountability and power delivery performance and reduce fuel consumption.

2. Description of Related Art

Typically, multiple-shift mechanism of an automatic transmission is achieved by combining a plurality of planetary gear sets and a plurality of frictional elements. It is well known that when a planetary gear train realizes a greater number of shift speeds, speed ratios of the planetary gear train can be more optimally designed, and therefore a vehicle can have economical fuel mileage and better performance. For that reason, the planetary gear train that is able to realize more shift speeds is under continuous investigation.

Though achieving the same number of speeds, the planetary gear train has a different operating mechanism according to a connection between rotation elements (i.e., sun gear, planet carrier, and ring gear). In addition, the planetary gear train has different features such a durability, power delivery efficiency, and size depend on the layout thereof. Therefore, designs for a combining structure of a gear train are also under continuous investigation.

If the number of shift-speeds, however, increases, the number of components in the automatic transmission also increases. Therefore, mountability, cost, weight and power delivery efficiency may be deteriorated.

Particularly, since the planetary gear train having a number of components is hard to be mounted in a front wheel drive vehicle, researches for minimizing the number of components have been developed.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a planetary gear train of an automatic transmission for a vehicle having advantages of improving mountability by shortening a length thereof and reducing the number of components as a consequence of achieving eight forward speeds and one reverse speed by disposing two planetary gear sets separately on a first shaft and a second shaft disposed in parallel with each other and connecting rotation elements of the planetary gear sets through a plurality of externally-meshed gears.

Various aspects of the present invention have been made in an effort to provide a planetary gear train of an automatic transmission for a vehicle having further advantages of enabling of setting optimum gear ratios due to ease of changing gear ratios by using a plurality of externally-meshed gears, and accordingly improving power delivery performance and fuel economy.

Various aspects of the present invention provide for a planetary gear train of an automatic transmission for a vehicle that may include: a first shaft receiving torque of an engine; a second shaft disposed in parallel with the first shaft with a predetermined distance; a first planetary gear set disposed on the first shaft, and including a first rotation element selectively connected to the first shaft, a second rotation element selectively connected to the first shaft and selectively connected to a transmission housing, and a third rotation element; a second planetary gear set disposed on the second shaft, and including a fourth rotation element connected to the first rotation element through an externally-meshed gear and selectively connected to the first shaft through an externally-meshed gear, a fifth rotation element connected to the third rotation element through an externally-meshed gear and directly connected to an output gear, and a sixth rotation element selectively connected to the first shaft through an externally-meshed gear and selectively connected to the transmission housing; three transfer gears forming the externally-meshed gears; and frictional elements including clutches selectively connecting the first shaft to rotation elements of the first and second planetary gear sets and brakes selectively connecting rotation elements of the first and second planetary gear sets to the transmission housing.

The first planetary gear set may be a single pinion planetary gear set including a first sun gear being the first rotation element, a first planet carrier being the second rotation element, and a first ring gear being the third rotation element, and the second planetary gear set may be a single pinion planetary gear set including a second sun gear being the fourth rotation element, a second planet carrier being the fifth rotation element, and a second ring gear being the sixth rotation element.

The three transfer gears may include: a first transfer gear connecting the third rotation element to the fifth rotation element; a second transfer gear connecting the first rotation element to the fourth rotation element; and a third transfer gear selectively connecting the first shaft to the fourth rotation element or the sixth rotation element.

The frictional elements may include: a first clutch disposed between the first shaft and the first rotation element; a second clutch disposed between the third transfer gear and the fourth rotation element; a third clutch disposed between the first shaft and the second rotation element; a fourth clutch disposed between the third transfer gear and the sixth rotation element; a first brake disposed between the sixth rotation element and the transmission housing; and a second brake disposed between the second rotation element and the transmission housing.

The first clutch and the first brake may be operated at a first forward speed, the second clutch and the first brake may be operated at a second forward speed, the third clutch and the first brake may be operated at a third forward speed, the second clutch and the third clutch may be operated at a fourth forward speed, the first clutch and the third clutch may be operated at a fifth forward speed, the third clutch and the fourth clutch may be operated at a sixth forward speed, the first clutch and the fourth clutch may be operated at a seventh forward speed, the second clutch and the fourth clutch may be operated at an eighth forward speed, and the first clutch and the second brake may be operated at a reverse speed.

The first planetary gear set may be a double pinion planetary gear set including a first sun gear being the first rotation element, a first ring gear being the second rotation element, and a first planet carrier being the third rotation element, and the second planetary gear set may be a single pinion planetary gear set including a second sun gear being the fourth rotation element, a second planet carrier being the fifth rotation element, and a second ring gear being the sixth rotation element.

The first planetary gear set may be a single pinion planetary gear set including a first sun gear being the first rotation element, a first planet carrier being the second rotation element, and a first ring gear being the third rotation element, and the second planetary gear set may be a double pinion planetary gear set including a second sun gear being the fourth rotation element, a second ring gear being the fifth rotation element, and a second planet carrier being the sixth rotation element.

The first planetary gear set may be a double pinion planetary gear set including a first sun gear being the first rotation element, a first ring gear being the second rotation element, and a first planet carrier being the third rotation element, and the second planetary gear set may be a double pinion planetary gear set including a second sun gear being the fourth rotation element, a second ring gear being the fifth rotation element, and a second planet carrier being the sixth rotation element.

Various aspects of the present invention provide for a planetary gear train of an automatic transmission for a vehicle that may include: a first shaft receiving torque of an engine; a second shaft disposed in parallel with the first shaft with a predetermined distance; a first planetary gear set disposed on the first shaft, and including a first rotation element selectively connected to the first shaft, a second rotation element selectively connected to the first shaft and selectively connected to a transmission housing, and a third rotation element; a second planetary gear set disposed on the second shaft, and including a fourth rotation element connected to the first rotation element and selectively connected to the first shaft, a fifth rotation element connected to the third rotation element and directly connected to an output gear, and a sixth rotation element selectively connected to the first shaft and selectively connected to the transmission housing; a first transfer gear connecting the third rotation element to the fifth rotation element; a second transfer gear connecting the first rotation element to the fourth rotation element; a third transfer gear selectively connecting the first shaft to the fourth rotation element or the sixth rotation element; and frictional elements including clutches selectively connecting the first shaft to rotation elements of the first and second planetary gear sets and brakes selectively connecting rotation elements of the first and second planetary gear sets to the transmission housing.

The first planetary gear set may be a single pinion planetary gear set including a first sun gear being the first rotation element, a first planet carrier being the second rotation element, and a first ring gear being the third rotation element, and the second planetary gear set may be a single pinion planetary gear set including a second sun gear being the fourth rotation element, a second planet carrier being the fifth rotation element, and a second ring gear being the sixth rotation element.

The frictional elements may include: a first clutch disposed between the first shaft and the first rotation element; a second clutch disposed between the third transfer gear and the fourth rotation element; a third clutch disposed between the first shaft and the second rotation element; a fourth clutch disposed between the third transfer gear and the sixth rotation element; a first brake disposed between the sixth rotation element and the transmission housing; and a second brake disposed between the second rotation element and the transmission housing.

The first clutch and the first brake may be operated at a first forward speed, the second clutch and the first brake may be operated at a second forward speed, the third clutch and the first brake may be operated at a third forward speed, the second clutch and the third clutch may be operated at a fourth forward speed, the first clutch and the third clutch may be operated at a fifth forward speed, the third clutch and the fourth clutch may be operated at a sixth forward speed, the first clutch and the fourth clutch may be operated at a seventh forward speed, the second clutch and the fourth clutch may be operated at an eighth forward speed, and the first clutch and the second brake may be operated at a reverse speed.

The first planetary gear set may be a double pinion planetary gear set including a first sun gear being the first rotation element, a first ring gear being the second rotation element, and a first planet carrier being the third rotation element, and the second planetary gear set may be a single pinion planetary gear set including a second sun gear being the fourth rotation element, a second planet carrier being the fifth rotation element, and a second ring gear being the sixth rotation element.

The first planetary gear set may be a single pinion planetary gear set including a first sun gear being the first rotation element, a first planet carrier being the second rotation element, and a first ring gear being the third rotation element, and the second planetary gear set may be a double pinion planetary gear set including a second sun gear being the fourth rotation element, a second ring gear being the fifth rotation element, and a second planet carrier being the sixth rotation element.

The first planetary gear set may be a double pinion planetary gear set including a first sun gear being the first rotation element, a first ring gear being the second rotation element, and a first planet carrier being the third rotation element, and the second planetary gear set may be a double pinion planetary gear set including a second sun gear being the fourth rotation element, a second ring gear being the fifth rotation element, and a second planet carrier being the sixth rotation element.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of friction elements at each shift-speed applied to the planetary gear train of FIG. 1.

FIG. 3A is a lever diagram of a planetary gear train of the planetary gear train of FIG. 1 at the first forward speed.

FIG. 3C is a lever diagram of a planetary gear train of the planetary gear train of FIG. 1 at the third forward speed.

FIG. 3D is a lever diagram of a planetary gear train of the planetary gear train of FIG. 1 at the fourth forward speed.

FIG. 3E is a lever diagram of a planetary gear train of the planetary gear train of FIG. 1 at the fifth forward speed.

FIG. 3H is a lever diagram of a planetary gear train of the planetary gear train of FIG. 1 at the eighth forward speed.

DETAILED DESCRIPTION

Figure 1:
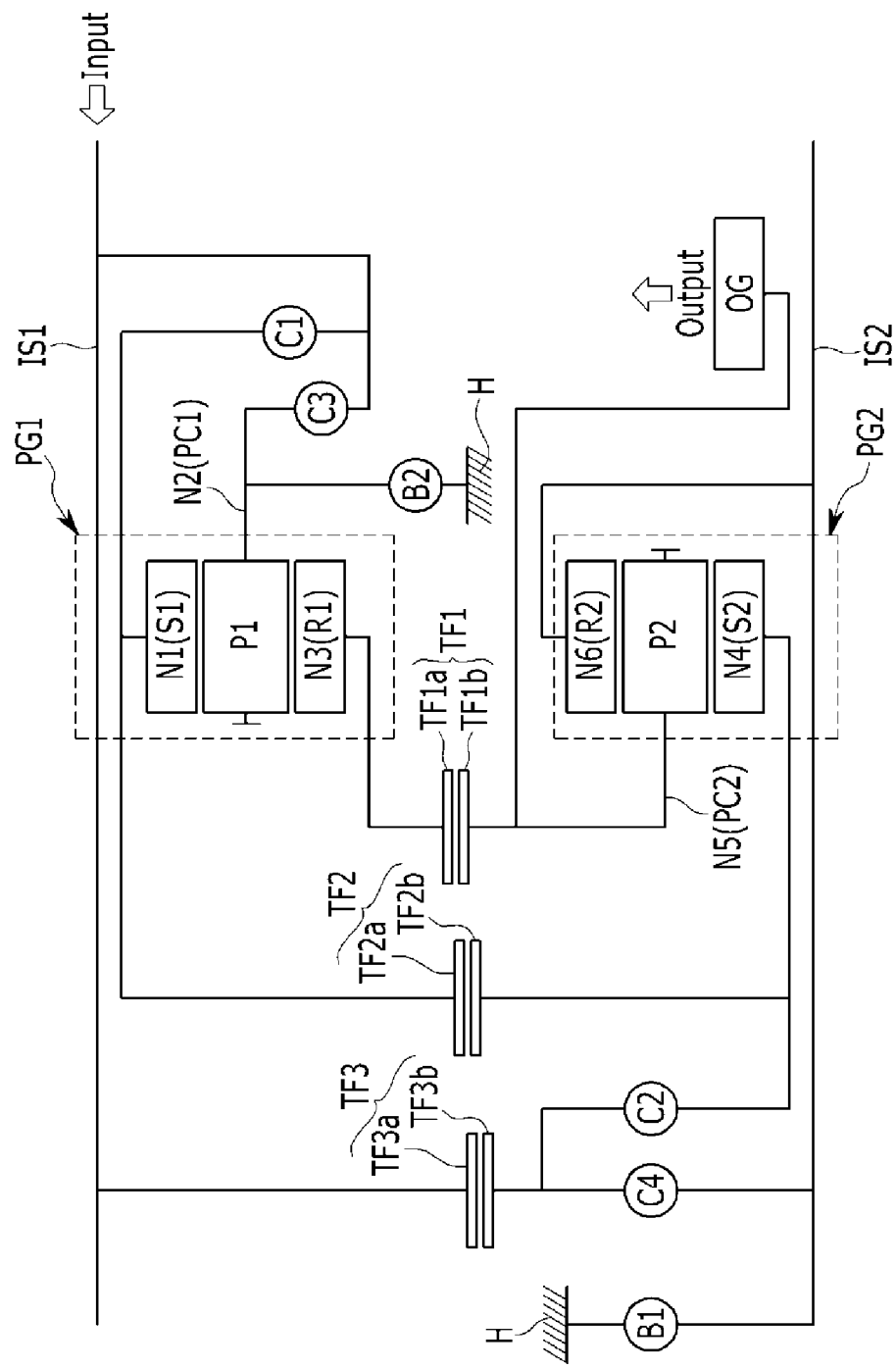
FIG. 1 is a schematic diagram of a planetary gear train according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining the various embodiments will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a planetary gear train according to various embodiments of the present invention.

Referring to FIG. 1, a planetary gear train according to various embodiments of the present invention includes a first planetary gear set PG1 disposed on a first shaft IS1, a second planetary gear set PG2 disposed on a second shaft IS2 disposed in parallel with the first shaft IS1, three transfer gears TF1, TF2, and TF3, and frictional elements consisting of four clutches C1, C2, C3, and C4 and two brakes B1 and B2.

Therefore, torque input from the first shaft IS1 is converted into eight forward speeds and one reverse speed by cooperation of the first and second planetary gear sets PG1 and PG2, and is then output through an output gear OG.

The first shaft IS1 is an input member, and torque from a crankshaft of an engine is changed through a torque converter and is then input to the first shaft IS1. The first shaft IS1 supports the first planetary gear set PG1 without rotational interference therebetween.

The second shaft IS2 rotatably supports the second planetary gear set PG2.

The first planetary gear set PG1 is a single pinion planetary gear set, and includes a first rotation element N1 being a first sun gear S1, a second rotation element N2 being a first planet carrier PC1 rotatably supporting a first pinion P1 externally meshed with the first sun gear S1, and a third rotation element N3 being a first ring gear R1 internally meshed with the first pinion P1.

The second planetary gear set PG2 is a single pinion planetary gear set, and includes a fourth rotation element N4 being a second sun gear S2, a fifth rotation element N5 being a second planet carrier PC2 rotatably supporting a second pinion P2 eternally meshed with the second sun gear S2, and a sixth rotation element N6 being a second ring gear R2 internally meshed with the second pinion P2.

The first rotation element N1 is selectively connected to the first shaft IS1, and the second rotation element N2 is selectively connected to the first shaft IS1 and is selectively connected to a transmission housing H.

The fourth rotation element N2 is connected to the first rotation element N1 through an externally-meshed gear and is selectively connected to the first shaft IS1 through an externally-meshed gear. The fifth rotation element N5 is connected to the third rotation element N3 through an externally-meshed gear and is directly connected to the output gear OG. The sixth rotation element N6 is connected to the second shaft IS2, is selectively connected to the first shaft IS1 through an externally-meshed gear, and is selectively connected to the transmission housing H.

The output gear OG drives a driving axle including a driving wheel through a final reduction gear and a differential apparatus.

The first, second, and third transfer gears TF1, TF2, and TF3 respectively have first, second, and third transfer drive gears TF1$a$, TF2$a$, and TF3$a$ and first, second, and third transfer driven gears TF1$b$, TF2$b$, and TF3$b$ externally meshed with each other.

The first transfer gear TF1 externally meshes the third rotation element N3 to the fifth rotation element N5.

The second transfer gear TF2 externally meshes the first rotation element N1 to the fourth rotation element N4.

The third transfer gear TF3 externally meshes the first shaft IS1 to the fourth rotation element N4 and the sixth rotation element N6 selectively.

Therefore, the rotation elements connected through the first, second, and third transfer gears TF1, TF2, and TF3 are rotated in opposite direction to each other according to gear ratios of the first, second, and third transfer gears TF1, TF2, and TF3.

In addition, four clutches C1, C2, C3, and C4 connecting selected rotation elements with each other and two brakes B1 and B2 connecting selected rotation elements to the transmission housing H are disposed as follows.

The first clutch C1 is disposed between the first shaft IS1 and the second transfer gear TF2 (i.e., first rotation element N1).

The second clutch C2 selectively connects the first shaft IS1 to the fourth rotation element N4 and is disposed between the third transfer gear TF3 and the fourth rotation element N4.

The third clutch C3 is disposed between the first shaft IS1 and the second rotation element N2.

The fourth clutch C4 selectively connects the first shaft IS1 to the sixth rotation element N6 (i.e., second shaft IS2) and is disposed between the third transfer gear TF3 and the sixth rotation element N6 (i.e., second shaft IS2).

The first brake B1 is disposed between the sixth rotation element N6 (i.e., second shaft IS2) and the transmission housing H.

The second brake B2 is disposed between the second rotation element N2 and the transmission housing H.

The frictional elements consisting of the first, second, third, and fourth clutches C1, C2, C3, and C4 and the first and second brakes B1 and B2 are conventional multi-plate friction elements of wet type that are operated by hydraulic pressure.

FIG. 2 is an operational chart of friction elements at each shift-speed applied to a planetary gear train according to various embodiments of the present invention.

As shown in FIG. 2, two frictional elements are operated at each shift-speed in the planetary gear train according to various embodiments of the present invention.

The first clutch C1 and the first brake B1 are operated at a first forward speed $1^{ST}$.

The second clutch C2 and the first brake B1 are operated at a second forward speed $2^{ND}$.

The third clutch C3 and the first brake B1 are operated at a third forward speed $3^{RD}$.

The second clutch C2 and the third clutch C3 are operated at a fourth forward speed $4^{TH}$.

The first clutch C1 and the third clutch C3 are operated at a fifth forward speed $5^{TH}$.

The third clutch C3 and the fourth clutch C4 are operated at a sixth forward speed $6^{TH}$.

The first clutch C1 and the fourth clutch C4 are operated at a seventh forward speed $7^{TH}$.

The second clutch C2 and the fourth clutch C4 are operated at an eighth forward speed $8^{TH}$.

The first clutch C1 and the second brake B2 are operated at a reverse speed Rev.

FIG. 3A to FIG. 3I are lever diagrams of a planetary gear train according to various embodiments of the present invention, and illustrate shift processes of the planetary gear train according to various embodiments of the present invention by lever analysis method.

Referring to FIG. 3A to FIG. 3I, three vertical lines of the first planetary gear set PG1 are set as the first, second, and third rotation elements N1, N2, and N3 from the left.

Three vertical lines of the second planetary gear set PG2 are set as the fourth, fifth, and sixth rotation elements N4, N5, and N6 from the left. A middle horizontal line represents a rotation speed of "0", an upper horizontal line represents positive rotation speed and a lower horizontal line represents negative rotation speed.

"-" means that rotational elements are rotated in an opposite direction to the rotation direction of the engine. It is because the rotation elements are externally meshed through the first, second, and third transfer gears TF1, TF2, and TF3 without an idling gear.

In addition, distances between the vertical lines of the first and second planetary gear sets PG1 and PG2 are set according to gear ratios (teeth number of a sun gear/teeth number of a ring gear).

Hereinafter, referring to FIG. 2 and FIG. 3, the shift processes of the planetary gear train according to various embodiments of the present invention will be described in detail.

First Forward Speed

Referring to FIG. 2, the first clutch C1 and the first brake B1 are operated at the first forward speed $1^{ST}$.

As shown in FIG. 3A, rotation speed of the first shaft IS1 is input to the first rotation element N1 by operation of the first clutch C1, and is changed according to the gear ratio of the second transfer gear TF2 and is then input to the fourth rotation element N4 as inverse rotation speed. In addition, the sixth rotation element N6 is operated as the fixed element by operation of the first brake B1.

Therefore, the rotation elements of the first planetary gear set PG1 form a first forward speed line T1 and the rotation elements of the second planetary gear set PG2 form a first shift line SP1 by cooperation of the rotation elements of the first planetary gear set PG1 and the second planetary gear set PG2. Therefore, D1 is output through the fifth rotation element N5 that is the output element.

Second Forward Speed

The first clutch C1 that was operated at the first forward speed $1^{ST}$ is released and the second clutch C2 is operated at the second forward speed $2^{ND}$.

Figure 3B:
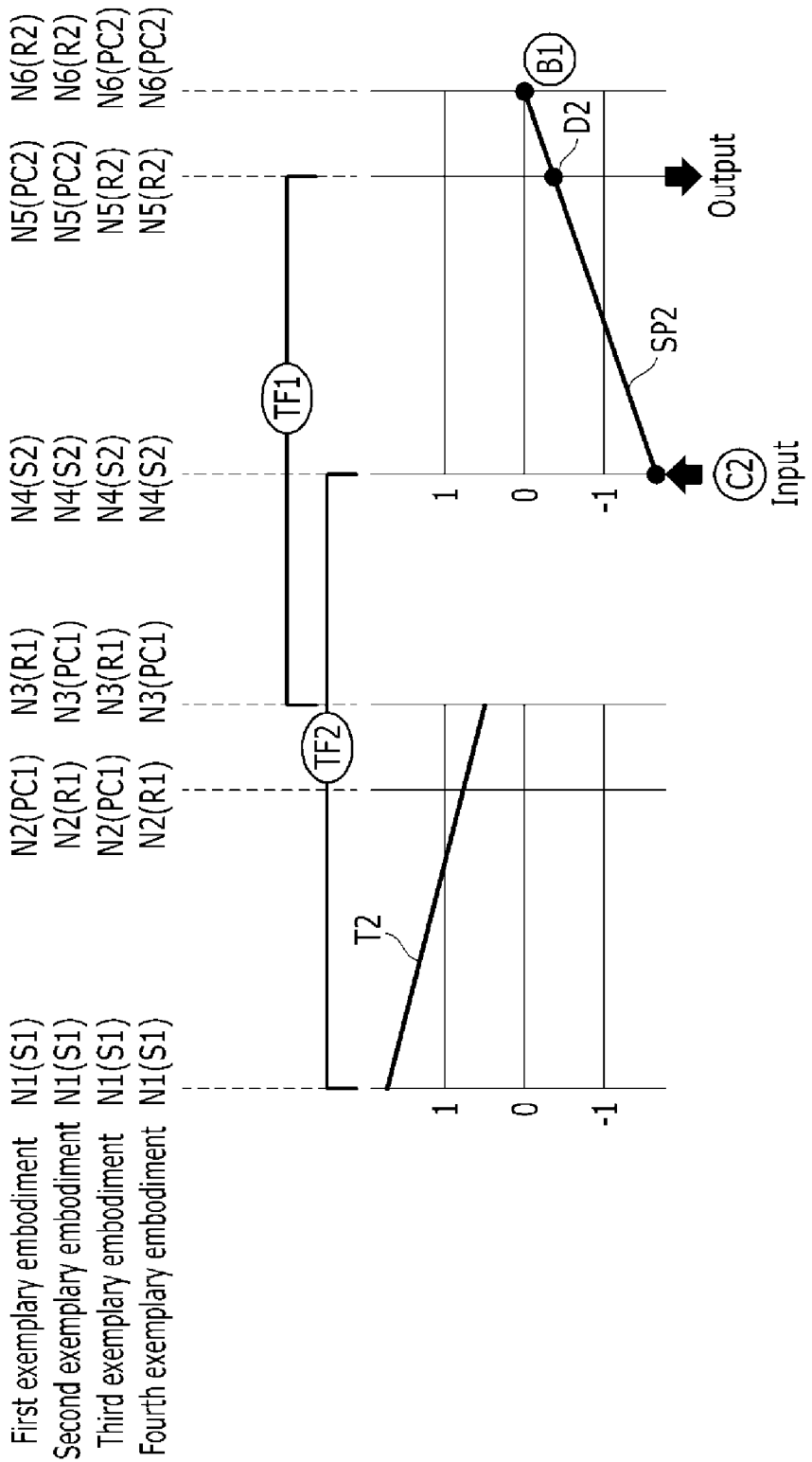
FIG. 3B is a lever diagram of a planetary gear train of the planetary gear train of FIG. 1 at the second forward speed.

As shown in FIG. 3B, the rotation speed of the first shaft IS1 is changed according to the gear ratio of the third transfer gear TF3 and is then input to the fourth rotation element N4 as inverse rotation speed by operation of the second clutch C2. In addition, the sixth rotation element N6 is operated as the fixed element by operation of the first brake B1.

Therefore, the rotation elements of the first planetary gear set PG1 form a second forward speed line T2 and the rotation elements of the second planetary gear set PG2 form a second shift line SP2 by cooperation of the rotation elements of the first planetary gear set PG1 and the second planetary gear set PG2. Therefore, D2 is output through the fifth rotation element N5 that is the output element.

Third Forward Speed

The second clutch C2 that was operated at the second forward speed $2^{ND}$ is released and the third clutch C3 is operated at the third forward speed $3^{RD}$.

As shown in FIG. 3C, the rotation speed of the first shaft IS1 is input to the second rotation element N2 by operation of the third clutch C3, and the sixth rotation element N6 is operated as the fixed element by operation of the first brake B1.

Therefore, the rotation elements of the first planetary gear set PG1 form a third forward speed line T3 and the rotation elements of the second planetary gear set PG2 form a third shift line SP3 by cooperation of the rotation elements of the first planetary gear set PG1 and the second planetary gear set PG2. Therefore, D3 is output through the fifth rotation element N5 that is the output element.

Fourth Forward Speed

The first brake B1 that was operated at the third forward speed $3^{RD}$ is released and the second clutch C2 is operated at the fourth forward speed $4^{TH}$.

As shown in FIG. 3D, the rotation speed of the first shaft IS1 is changed according to the gear ratio of the third transfer gear TF3 and is then input to the fourth rotation element N4 as the inverse rotation speed by operation of the second clutch C2. In addition, the rotation speed of the first shaft IS1 is input to the second rotation element N2 by operation of the third clutch C3.

Therefore, the rotation elements of the first planetary gear set PG1 form a fourth forward speed line T4 and the rotation elements of the second planetary gear set PG2 form a fourth shift line SP4 by cooperation of the rotation elements of the first planetary gear set PG1 and the second planetary gear set PG2. Therefore, D4 is output through the fifth rotation element N5 that is the output element.

Fifth Forward Speed

The second clutch C2 that was operated at the fourth forward speed $4^{TH}$ is released and the first clutch C1 is operated at the fifth forward speed $5^{TH}$.

As shown in FIG. 3E, the rotation speed of the first shaft IS1 is input to the first rotation element N1 by operation of the first clutch C1, and is changed according to the gear ratio of the second transfer gear TF2 is then input to the fourth rotation element N4 as inverse rotation speed. In addition, the rotation speed of the first shaft IS1 is input to the second rotation element N2 by operation of the third clutch C3.

Therefore, the first planetary gear set PG1 becomes direct-coupling state, the rotation elements of the first planetary gear set PG1 form a fifth forward speed line T5, and the rotation elements of the second planetary gear set PG2 form a fifth shift line SP5. Therefore, D5 is output through the fifth rotation element N5 that is the output element.

Sixth Forward Speed

The first clutch C1 that was operated at the fifth forward speed $5^{TH}$ is released and the fourth clutch C4 is operated at the sixth forward speed $6^{TH}$.

Figure 3F:
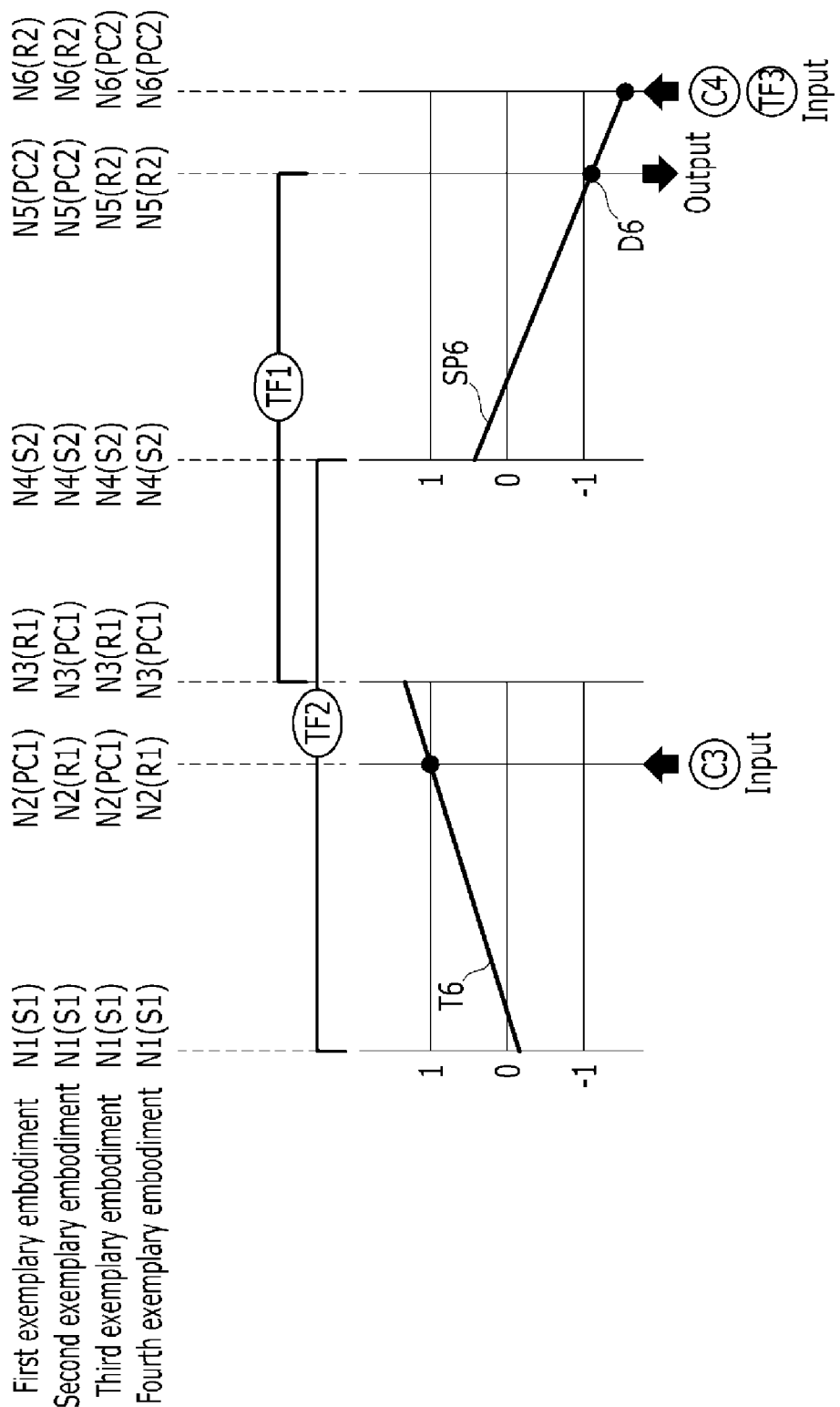
FIG. 3F is a lever diagram of a planetary gear train of the planetary gear train of FIG. 1 at the sixth forward speed.

As shown in FIG. 3F, the rotation speed of the first shaft IS1 is input to the second rotation element N2 by operation of the third clutch C3, and is changed according to the gear ratio of the third transfer gear TF3 and is then input to the sixth rotation element N6 as inverse rotation speed by operation of the fourth clutch C4.

Therefore, the rotation elements of the first planetary gear set PG1 form a sixth forward speed line T6 and the rotation elements of the second planetary gear set PG2 form a sixth shift line SP6 by cooperation of the rotation elements of the first planetary gear set PG1 and the second planetary gear set PG2. Therefore, D6 is output through the fifth rotation element N5 that is the output element.

Seventh Forward Speed

The third clutch C3 that was operated at the sixth forward speed $6^{TH}$ is released and the first clutch C1 is operated at the seventh forward speed $7^{TH}$.

Figure 3G:
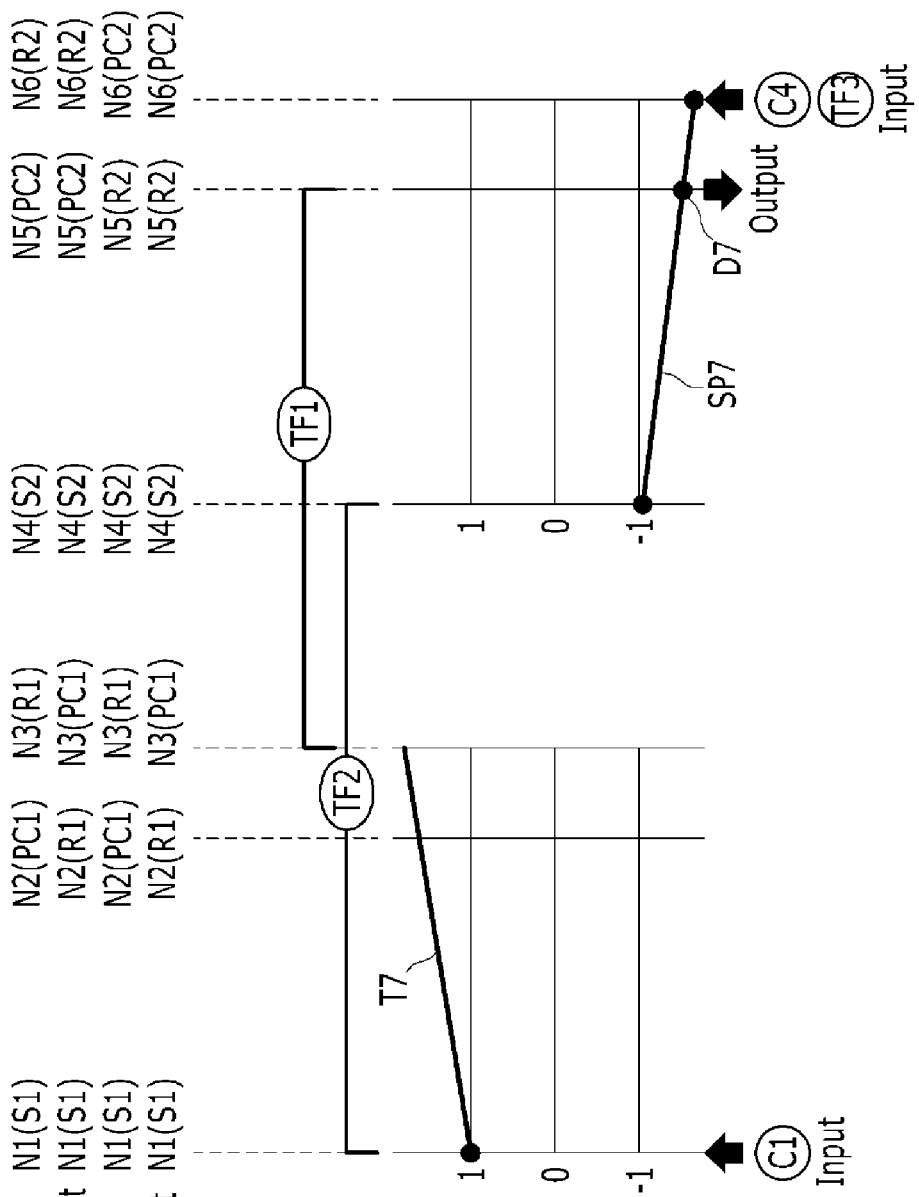
FIG. 3G is a lever diagram of a planetary gear train of the planetary gear train of FIG. 1 at the seventh forward speed.

As shown in FIG. 3G, the rotation speed of the first shaft IS1 is input to the first rotation element N1 by operation of the first clutch C1, and is changed according to the gear ratio of the second transfer gear TF2 and is then input to the fourth rotation element N4 as inverse rotation speed. In addition, the rotation speed of the first shaft IS1 is changed according to the gear ratio of the third transfer gear TF3 and is then input to the sixth rotation element N6 as the inverse rotation speed by operation of the fourth clutch C4.

Therefore, the rotation elements of the first planetary gear set PG1 form a seventh forward speed line T7 and the rotation elements of the second planetary gear set PG2 form a seventh shift line SP7 by cooperation of the rotation elements of the first planetary gear set PG1 and the second planetary gear set PG2. Therefore, D7 is output through the fifth rotation element N5 that is the output element.

Eighth Forward Speed

The first clutch C1 that was operated at the seventh forward speed $7^{TH}$ is released and the second clutch C2 is operated at the eighth forward speed $8^{TH}$.

As shown in FIG. 3H, the rotation speed of the first shaft IS1 is changed according to the gear ratio of the third transfer gear TF3 and is then input to the fourth rotation element N4 as inverse rotation speed by operation of the second clutch C2. In addition, the rotation speed of the first shaft IS1 is changed according to the gear ratio of the third transfer gear TF3 and is then input to the sixth rotation element N6 as inverse rotation speed by operation of the fourth clutch C4.

Therefore, the rotation elements of the first planetary gear set PG1 form an eighth forward speed line T8 and the rotation elements of the second planetary gear set PG2 form an eighth shift line SP8 by cooperation of the rotation elements of the first planetary gear set PG1 and the second planetary gear set PG2. Therefore, D8 is output through the fifth rotation element N5 that is the output element.

Reverse Speed

As shown in FIG. 2, the first clutch C1 and the second brake B2 are operated at the reverse speed Rev.

Figure 3I:
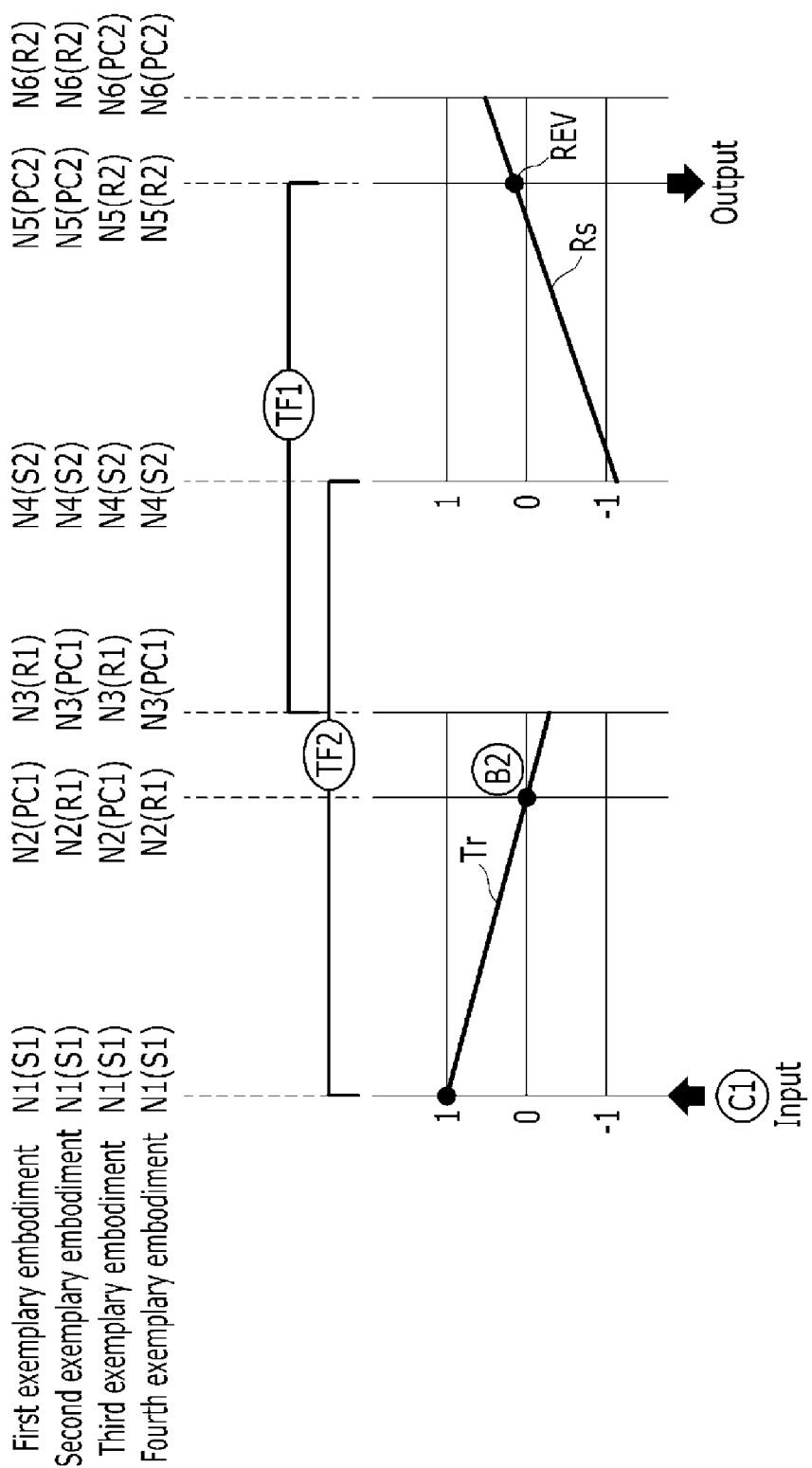
FIG. 3I is a lever diagram of a planetary gear train of the planetary gear train of FIG. 1 at the reverse speed.

As shown in FIG. 3I, the rotation speed of the first shaft IS1 is input to the first rotation element N1 by operation of the first clutch C1, and is changed according to the gear ratio of the second transfer gear TF2 and is then input to the fourth rotation element N4 as the inverse rotation speed. In addition, the second rotation element N2 is operated as the fixed element by operation of the second brake B2.

Therefore, the rotation elements of the first planetary gear set PG1 form a reverse speed line Tr and the rotation elements of the second planetary gear set PG2 form a reverse shift line RS by cooperation of the rotation elements of the first planetary gear set PG1 and the second planetary gear set PG2. Therefore, REV is output through the fifth rotation element N5 that is the output element.

As described above, the planetary gear train according to various embodiments of the present invention can achieve eight forward speed and one reverse speed by combining two planetary gear sets PG1 and PG2 being the simple planetary gear sets with three transfer gears TF1, TF2, and TF3 being the externally-meshed gears and six frictional elements C1, C2, C3, C4, B1, and B2.

In addition, optimum gear ratios may be set due to ease of changing gear ratios by using three transfer gears being externally-meshed gears as well as the planetary gear sets. Since gear ratios can be changed according to target performance, starting performance, power delivery performance and fuel economy may be improved. Therefore, a start-up clutch instead of a torque converter may be used.

In addition, two friction elements are operated at each shift-speed and one friction element is released and another friction element is operated so as to shift to a neighboring shift-speed. Therefore, shift control condition is fully satisfied.

Figure 4:
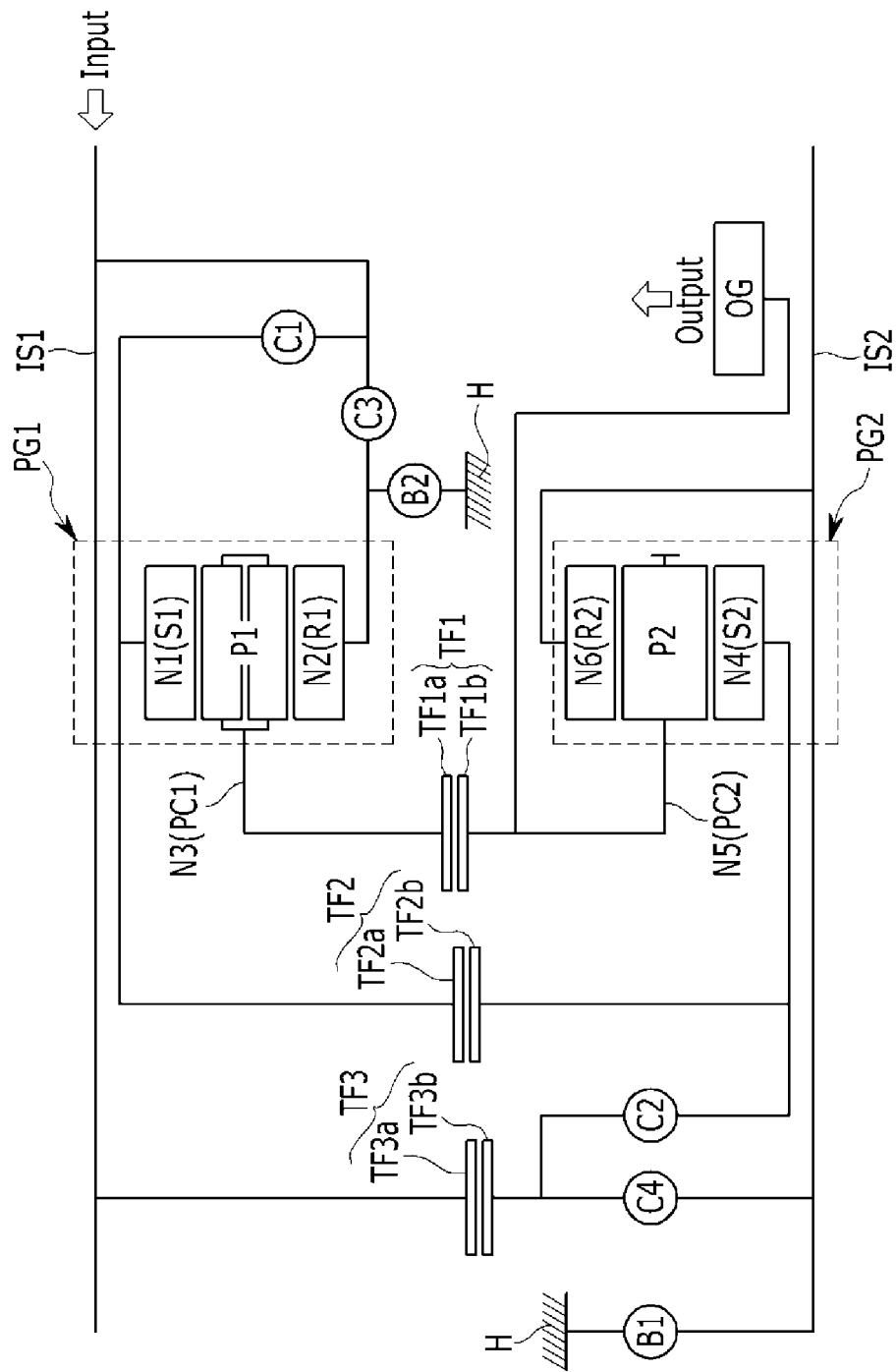
FIG. 4 is a schematic diagram of an exemplary planetary gear train according to the present invention.

FIG. 4 is a schematic diagram of a planetary gear train according to various embodiments of the present invention.

Referring to FIG. 4, the first planetary gear set PG1 is the single pinion planetary gear set of the planetary gear train of FIG. 1, but the first planetary gear set PG1 is a double pinion planetary gear set in the planetary gear train of FIG. 4.

Therefore, the second rotation element N2 is changed from the first planet carrier PC1 to the first ring gear R1, and the third rotation element N3 is changed from the first ring gear R1 to the first planet carrier PC1.

Since functions of the planetary gear train of FIG. 4 are the same as those of planetary gear train of the planetary gear train of FIG. 1 except the rotation elements consisting of the second and third rotation elements N2 and N3, detailed description thereof will be omitted.

Figure 5:
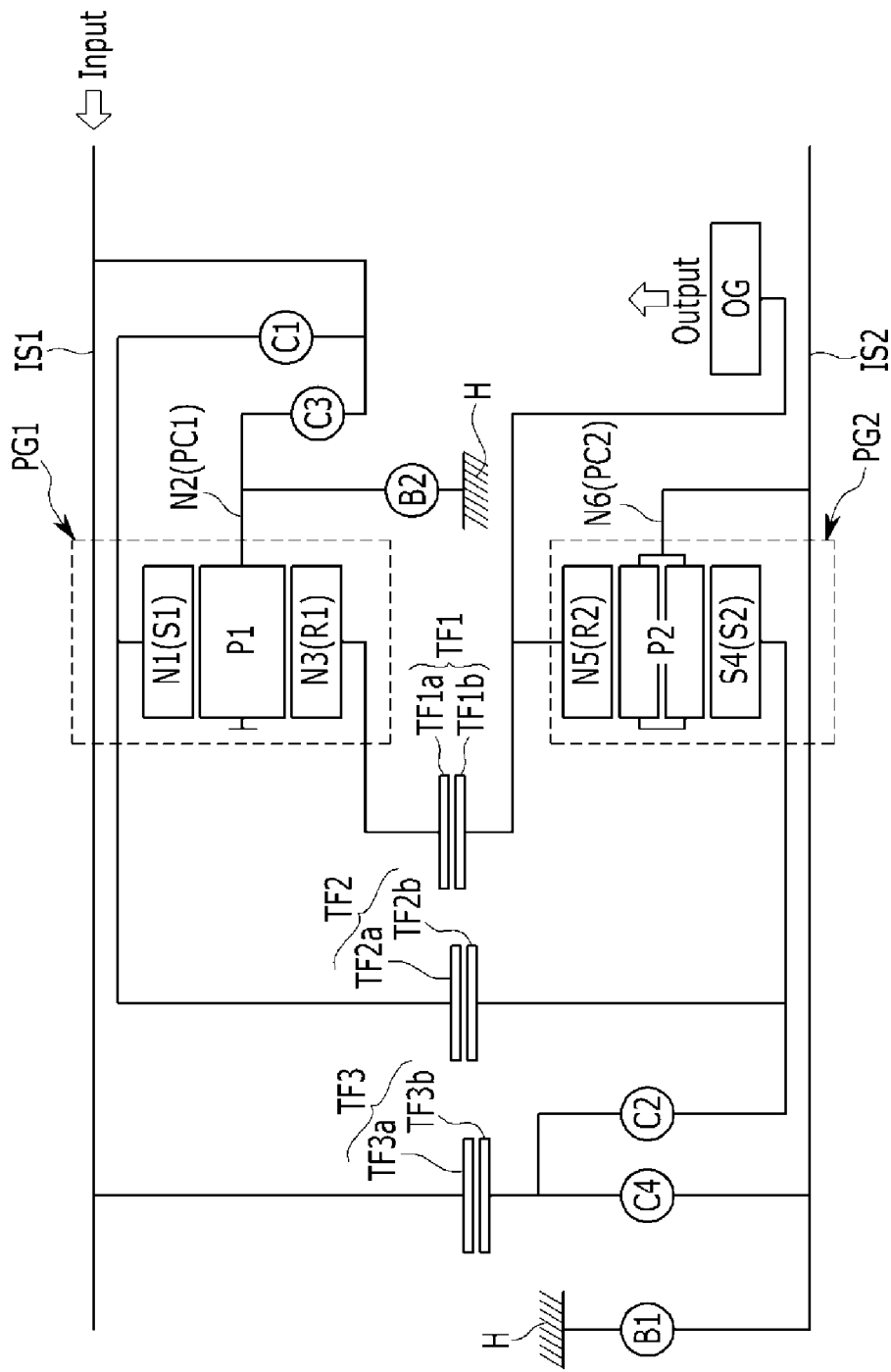
FIG. 5 is a schematic diagram of an exemplary planetary gear train according to the present invention.

FIG. 5 is a schematic diagram of a planetary gear train according to various embodiments of the present invention.

Referring to FIG. 5, the second planetary gear set PG2 is the single pinion planetary gear set in of planetary gear train of the planetary gear train of FIG. 1, but the second planetary gear set PG2 is a double pinion planetary gear set in planetary gear train of FIG. 5.

Therefore, the fifth rotation element N5 is changed from the second planet carrier PC2 to the second ring gear R2, and the sixth rotation element N6 is changed from the second ring gear R2 to the second planet carrier PC2.

Since functions of the planetary gear train of FIG. 5 are the same as those of planetary gear train of the planetary gear train of FIG. 1 except the rotation elements consisting of the fifth and sixth rotation elements N5 and N6, detailed description thereof will be omitted.

Figure 6:
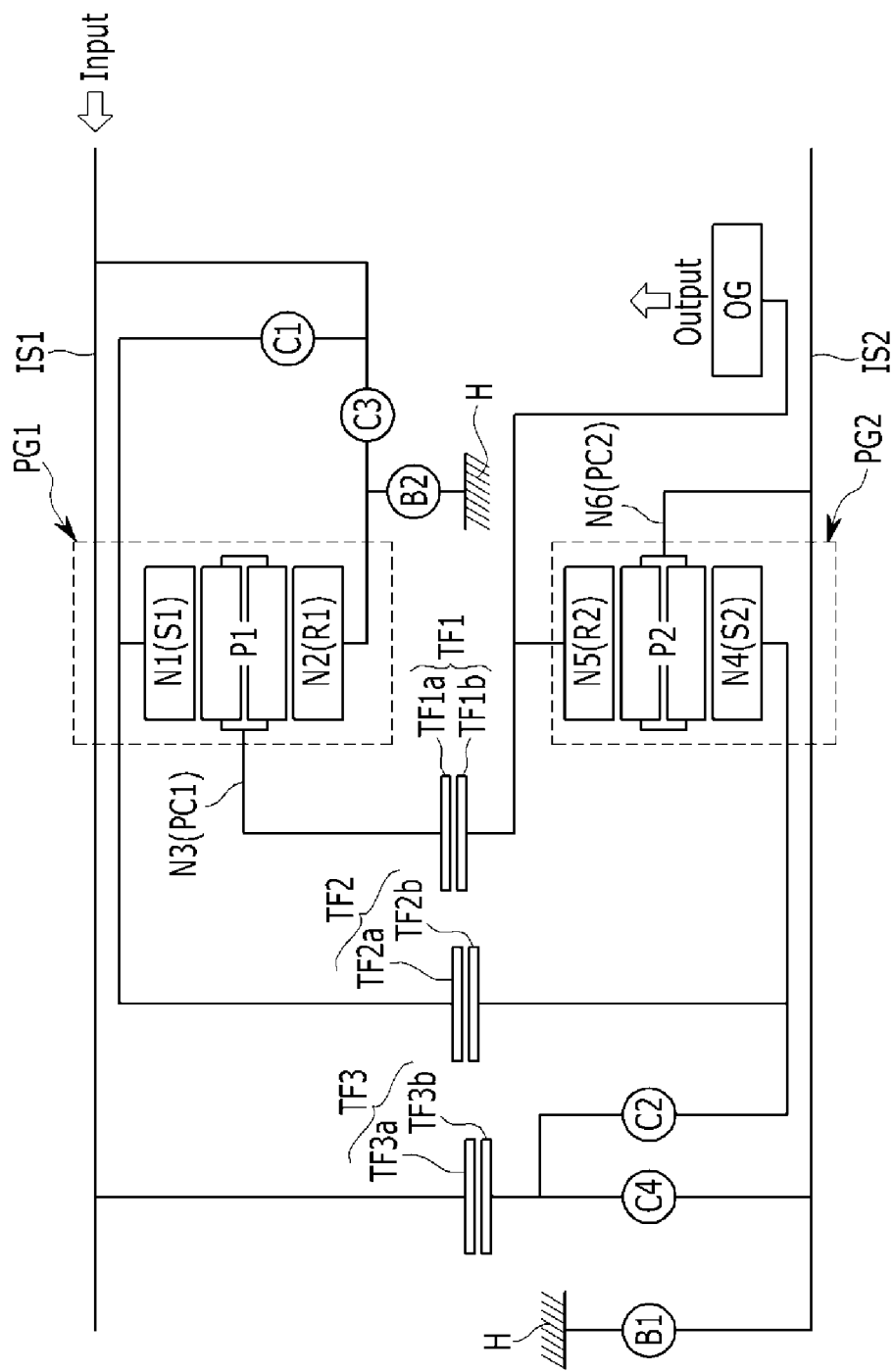
FIG. 6 is a schematic diagram of an exemplary planetary gear train according to the present invention.

FIG. 6 is a schematic diagram of a planetary gear train according to various embodiments of the present invention.

Referring to FIG. 6, the first and second planetary gear sets PG1 and PG2 are the single pinion planetary gear sets in the planetary gear train of FIG. 1, but the first and second planetary gear sets PG1 and PG2 are the double pinion planetary gear sets in the planetary gear train of FIG. 6.

Therefore, the second rotation element N2 is changed from the first planet carrier PC1 to the first ring gear R1, and the third rotation element N3 is changed from the first ring gear R1 to the first planet carrier PC1.

In addition, the fifth rotation element N5 is changed from the second planet carrier PC2 to the second ring gear R2, and the sixth rotation element N6 is changed from the second ring gear R2 to the second planet carrier PC2.

Since functions of the planetary gear train of FIG. 6 are the same as those of planetary gear train of the planetary gear train of FIG. 1 except the rotation elements consisting of the second, third, fifth, and sixth rotation elements N2, N3, N5, and N6, detailed description thereof will be omitted.

Eight forward speed and one reverse speed can be achieved by combining two planetary gear sets being the simple planetary gear sets, three transfer gears and six frictional elements according to various embodiments of the present invention.

In addition, since two planetary gear sets are disposed separately on the first shaft and the second shaft disposed in parallel with a predetermined distance, a length thereof may be reduced and mountability may be improved.

In addition, optimum gear ratios may be set due to ease of changing gear ratios by using three external-meshing gears as well as the planetary gear sets. Since gear ratios can be changed according to target performance, starting performance, power delivery performance, and fuel economy may be improved. Therefore, a start-up clutch instead of a torque converter may be used.

In addition, two friction elements are operated at each shift-speed, and one friction element is released and another friction element is operated so as to shift to a neighboring shift-speed. Therefore, shift control condition is fully satisfied.

For convenience in explanation and accurate definition in the appended claims, the terms upper or lower, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle comprising:
    a first shaft receiving torque of an engine;
    a second shaft disposed in parallel with the first shaft at a predetermined distance;
    a first planetary gear set on the first shaft, and including a first rotation element selectively connected to the first shaft, a second rotation element selectively connected to the first shaft and selectively connected to a transmission housing, and a third rotation element;
    a second planetary gear set on the second shaft, and including a fourth rotation element connected to the first rotation element through a first externally-meshed gear and selectively connected to the first shaft through a second externally-meshed gear, a fifth rotation element connected to the third rotation element through a third externally-meshed gear and directly connected to an output gear, and a sixth rotation element selectively connected to the first shaft through a fourth externally-meshed gear and selectively connected to the transmission housing;
    three transfer gears forming the first, second, third, and fourth externally-meshed gears respectively; and
    frictional elements including clutches selectively connecting the first shaft to rotation elements of the first and second planetary gear sets and brakes selectively connecting rotation elements of the first and second planetary gear sets to the transmission housing,
    wherein the three transfer gears comprise:
        a first transfer gear forming the third externally-meshed gear and connecting the third rotation element to the fifth rotation element;
        a second transfer gear forming the first externally-meshed gear and connecting the first rotation element to the fourth rotation element; and
        a third transfer gear forming the second and fourth externally-meshed gears and selectively connecting the first shaft to the fourth rotation element or the sixth rotation element.

2. The planetary gear train of claim 1, wherein the first planetary gear set is a single pinion planetary gear set including a first sun gear being the first rotation element, a first planet carrier being the second rotation element, and a first ring gear being the third rotation element, and
    wherein the second planetary gear set is a single pinion planetary gear set including a second sun gear being the fourth rotation element, a second planet carrier being the fifth rotation element, and a second ring gear being the sixth rotation element.

3. The planetary gear train of claim 1, wherein the frictional elements comprise:
    a first clutch disposed between the first shaft and the first rotation element;
    a second clutch disposed between the third transfer gear and the fourth rotation element;
    a third clutch disposed between the first shaft and the second rotation element;
    a fourth clutch disposed between the third transfer gear and the sixth rotation element;
    a first brake disposed between the sixth rotation element and the transmission housing; and
    a second brake disposed between the second rotation element and the transmission housing.

4. The planetary gear train of claim 3, wherein the first clutch and the first brake are operated at a first forward speed,
    the second clutch and the first brake are operated at a second forward speed,
    the third clutch and the first brake are operated at a third forward speed,
    the second clutch and the third clutch are operated at a fourth forward speed,
    the first clutch and the third clutch are operated at a fifth forward speed,
    the third clutch and the fourth clutch are operated at a sixth forward speed,
    the first clutch and the fourth clutch are operated at a seventh forward speed,
    the second clutch and the fourth clutch are operated at an eighth forward speed, and
    the first clutch and the second brake are operated at a reverse speed.

5. The planetary gear train of claim 1, wherein the first planetary gear set is a double pinion planetary gear set including a first sun gear being the first rotation element, a first ring gear being the second rotation element, and a first planet carrier being the third rotation element, and
    wherein the second planetary gear set is a single pinion planetary gear set including a second sun gear being the fourth rotation element, a second planet carrier being the fifth rotation element, and a second ring gear being the sixth rotation element.

6. The planetary gear train of claim 1, wherein the first planetary gear set is a single pinion planetary gear set including a first sun gear being the first rotation element, a first planet carrier being the second rotation element, and a first ring gear being the third rotation element, and wherein the second planetary gear set is a double pinion planetary gear set including a second sun gear being the fourth rotation element, a second ring gear being the fifth rotation element, and a second planet carrier being the sixth rotation element.

7. The planetary gear train of claim 1, wherein the first planetary gear set is a double pinion planetary gear set including a first sun gear being the first rotation element, a first ring gear being the second rotation element, and a first planet carrier being the third rotation element, and wherein the second planetary gear set is a double pinion planetary gear set including a second sun gear being the fourth rotation element, a second ring gear being the fifth rotation element, and a second planet carrier being the sixth rotation element.

8. A planetary gear train of an automatic transmission for a vehicle comprising:
a first shaft receiving torque of an engine;
a second shaft disposed in parallel with the first shaft at a predetermined distance;
a first planetary gear set on the first shaft, and including a first rotation element selectively connected to the first shaft, a second rotation element selectively connected to the first shaft and selectively connected to a transmission housing, and a third rotation element;
a second planetary gear set on the second shaft, and including a fourth rotation element connected to the first rotation element and selectively connected to the first shaft, a fifth rotation element connected to the third rotation element and directly connected to an output gear, and a sixth rotation element selectively connected to the first shaft and selectively connected to the transmission housing;
a first transfer gear connecting the third rotation element to the fifth rotation element;
a second transfer gear connecting the first rotation element to the fourth rotation element;
a third transfer gear selectively connecting the first shaft to the fourth rotation element or the sixth rotation element; and
frictional elements including clutches selectively connecting the first shaft to rotation elements of the first and second planetary gear sets and brakes selectively connecting rotation elements of the first and second planetary gear sets to the transmission housing.

9. The planetary gear train of claim 8, wherein the first planetary gear set is a single pinion planetary gear set including a first sun gear being the first rotation element, a first planet carrier being the second rotation element, and a first ring gear being the third rotation element, and wherein the second planetary gear set is a single pinion planetary gear set including a second sun gear being the fourth rotation element, a second planet carrier being the fifth rotation element, and a second ring gear being the sixth rotation element.

10. The planetary gear train of claim 8, wherein the frictional elements comprise:
a first clutch disposed between the first shaft and the first rotation element;
a second clutch disposed between the third transfer gear and the fourth rotation element;
a third clutch disposed between the first shaft and the second rotation element;
a fourth clutch disposed between the third transfer gear and the sixth rotation element;
a first brake disposed between the sixth rotation element and the transmission housing; and
a second brake disposed between the second rotation element and the transmission housing.

11. The planetary gear train of claim 10, wherein the first clutch and the first brake are operated at a first forward speed,
the second clutch and the first brake are operated at a second forward speed,
the third clutch and the first brake are operated at a third forward speed,
the second clutch and the third clutch are operated at a fourth forward speed,
the first clutch and the third clutch are operated at a fifth forward speed,
the third clutch and the fourth clutch are operated at a sixth forward speed,
the first clutch and the fourth clutch are operated at a seventh forward speed,
the second clutch and the fourth clutch are operated at an eighth forward speed, and
the first clutch and the second brake are operated at a reverse speed.

12. The planetary gear train of claim 8, wherein the first planetary gear set is a double pinion planetary gear set including a first sun gear being the first rotation element, a first ring gear being the second rotation element, and a first planet carrier being the third rotation element, and wherein the second planetary gear set is a single pinion planetary gear set including a second sun gear being the fourth rotation element, a second planet carrier being the fifth rotation element, and a second ring gear being the sixth rotation element.

13. The planetary gear train of claim 8, wherein the first planetary gear set is a single pinion planetary gear set including a first sun gear being the first rotation element, a first planet carrier being the second rotation element, and a first ring gear being the third rotation element, and wherein the second planetary gear set is a double pinion planetary gear set including a second sun gear being the fourth rotation element, a second ring gear being the fifth rotation element, and a second planet carrier being the sixth rotation element.

14. The planetary gear train of claim 8, wherein the first planetary gear set is a double pinion planetary gear set including a first sun gear being the first rotation element, a first ring gear being the second rotation element, and a first planet carrier being the third rotation element, and wherein the second planetary gear set is a double pinion planetary gear set including a second sun gear being the fourth rotation element, a second ring gear being the fifth rotation element, and a second planet carrier being the sixth rotation element.

* * * * *